Oct. 31, 1967 D. J. K. STUART ETAL 3,349,879
CLUTCH AND BRAKE WITH CONTROL VALVE
Filed June 21, 1965 7 Sheets-Sheet 1

United States Patent Office 3,349,879
Patented Oct. 31, 1967

3,349,879
CLUTCH AND BRAKE WITH CONTROL VALVE
Duncan James Keith Stuart, Solihull, Peter Edward Fraser, Droitwichworcester, John Michael Payne, Kings Norton, Birmingham, and Douglas Ralph Shotter, Marton, Rugby, England, assignors to Edward Williams Holdings Limited, Birmingham, England
Filed June 21, 1965, Ser. No. 465,268
Claims priority, application Great Britain, June 24, 1964, 26,075/64
3 Claims. (Cl. 192—18)

ABSTRACT OF THE DISCLOSURE

The control valve is for use in a power transmission incorporating a clutch and a brake and includes a valve body provided with a pair of ports adapted to be connected to the clutch and brake and additional ports adapted to be connected to a pressure fluid supply source and drain respectively. A drain port is separated from the clutch port by a first orifice, the clutch port from the supply port by a second orifice, the supply port from the brake port by a third orifice and the brake port from the supply port by a fourth orifice.

The operating member for the valve is defined by a needle or spool which extends through all of the orifices and is capable of longitudinal movement in opposite directions. The needle is provided with a peripheral configuration such that when the needle is moved longitudinally in one direction the effective area for fluid flow through the first and third orifices is decreased and in the opposite direction the effective area for fluid flow through the second and fourth orifices is decreased.

Hence, the needle is movable from a first position in which the clutch is engaged and the brake disengaged to a second position in which the clutch is disengaged and the brake engaged with the needle being positionable in an intermediate position in which neither clutch nor brake is fully engaged and in which slight movement of the needle in opposite directions increases the engagement of the clutch or brake.

---

This invention relates to change-speed power transmission mechanisms, and has as an object the provision of such a mechanism in a convenient form.

According to the invention there is provided, in a change-speed power transmission mechanism, a clutch and a brake, both of which are fluid pressure operable, and a control valve having an operating member which is movable from a first position in which the clutch is engaged and the brake is disengaged, to a second position in which the clutch is disengaged and the brake is engaged, the operating member being disposable in an intermediate position in which neither the clutch nor the brake is fully engaged and in which slight movement of the operating member in opposite directions increases the engagement of the clutch or the brake.

Reference will now be made to the accompanying drawings in which.

Figure 1:
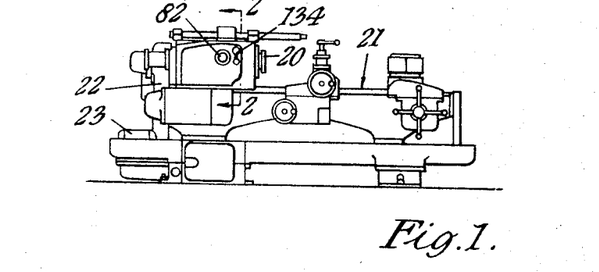
FIGURE 1 is a simplified side elevation of a turret lathe incorporating an example of the invention.
Figure 2:
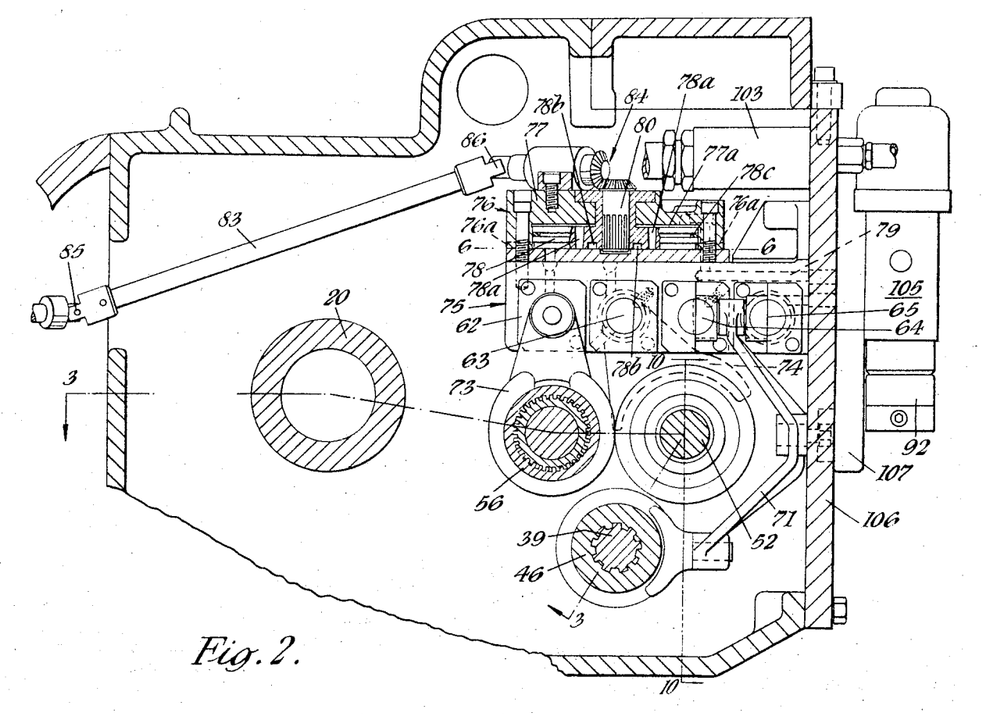
FIGURE 2 is an enlarged fragmentary section on line 2—2 through the headstock of the lathe shown in FIGURE 1.

In an example of the invention a change-speed power transmission mechanism is employed to drive spindle 20 of a turret lathe 21. The mechanism is arranged to provide twelve spindle speeds in each direction, as well as a free spindle condition. The drive is transmitted from an input member, in the form of pulley 24 which is connected by a belt drive 22 to motor 23, to an input shaft, through the intermediary of an hydraulically operable clutch 25. The clutch is of the friction plate type in which the various plates are clamped together, when it is required to transmit a drive, by an hydraulically operable thrust piston 26 mounted in an annular clutch cylinder 27. A brake 28 is also provided on the input shaft, the brake being of similar construction to the clutch and having one set of plates connected to a fixed part 29 of the headstock.

Figure 3:
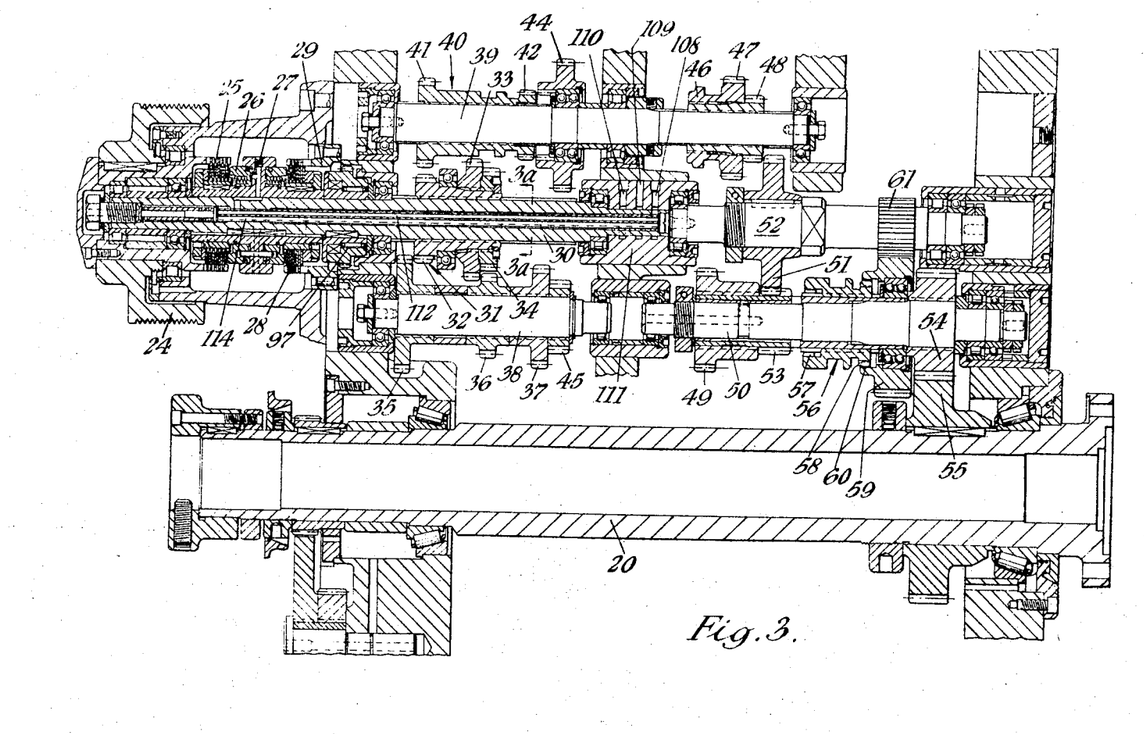
FIGURE 3 is a somewhat diagrammatic sectional view taken on line 3—3 in FIGURE 2.

Slidably mounted on a splined part of input shaft 30 is a toothed control member 31 comprising gear wheels 32, 33 and 34 of different sizes. The first toothed control member is axially movable between first, second and third positions and in these positions respectively the three gear wheels 32, 33 and 34 engage gear wheels 35, 36 and 37 respectively. These latter gear wheels are splined to a lay shaft 38 which is spaced from and parallel to the input shaft 30. This lay shaft 38 can therefore be driven at three different speeds relative to the input shaft.

Splined to a lay shaft 39 which is equally spaced from and parallel to both the input shaft 30 and the lay shaft 38, is a toothed control member 40 which has at one end a gear wheel 41 engageable with the gear wheel 35 when the member 40 occupies a first position. The other end of member 40 is externally splined at 42 so that when moved to a second position it can enter a splined hole 43 in gear wheel 44 rotatably mounted on lay shaft 39. This gear wheel 44 is continuously in mesh with a gear wheel 45 splined to lay shaft 38. Lay shaft 39 is thus drivable at two alternative speeds relative to lay shaft 38 and at six different speeds relative to the input shaft 30.

Another splined part of the lay shaft 39 carries a toothed control member 46 comprising gear wheels 47 and 48. Gear wheel 47 is engageable, when member 46 is moved to a first position with an equal gear wheel 49 which is rotatable on a lay shaft 50 coaxial with the lay shaft 38. Gear wheel 48 is engageable, when member 46 is moved to a second position, with a gear wheel 51 keyed to a lay shaft 52 coaxial with the input shaft 30, gear wheel 51 being also engaged with a gear wheel 53 of the same size as gear wheel 48 and secured to the gear wheel 49. Shaft 52 is thereby drivable either forwardly or rearwardly at six speeds.

Lay shaft 50 has an output gear 54 splined to one of its ends, this gear being engaged with a coacting gear 55 on the head stock spindle 20 which thereby forms the output member of the transmission. An axially slidable toothed control member 56 is provided on a splined part of the lay shaft 50 and this has a splined recess 57 at one end adapted to receive the teeth of gear wheel 53 when member 56 is moved to a first position. In forward drive, lay shaft 52 then takes no part in the transmission. In reverse, however, gear wheel 51 is interposed to reverse the direction of drive. The other end of control member 56 is splined at 58 so that when moved to a second position, it enters a splined hole 60 in a gear wheel 59 rotatable on lay shaft 50 and engaging a gear 61 on lay shaft 52 so as to provide an additional reduction step. The spindle 20 can therefore be driven at twelve different speeds in each direction.

Figure 5:
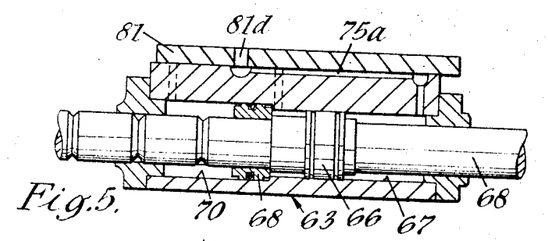
FIGURE 5 is a fragmentary sectional view on line 5—5 in FIGURE 4 the view being on an enlarged scale.
Figure 6:
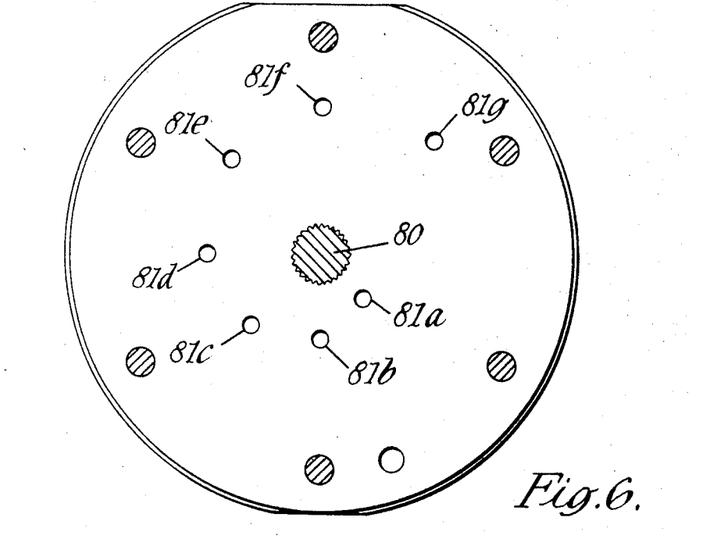
FIGURES 6 and 7 are sectional views on line 6—6 in FIGURE 2 taken looking in opposite directions the views being on enlarged scales.
Figure 7:
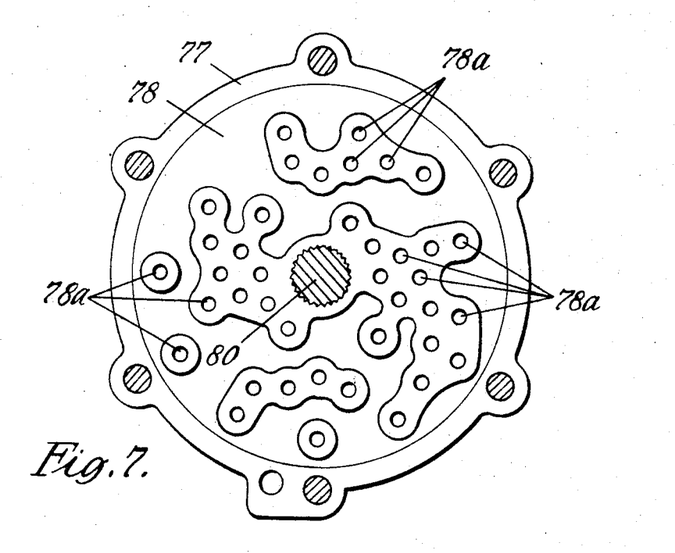

Four hydraulic cylinder units 62, 63, 64, 65 are employed to shift the four toothed control members 56, 31, 40 and 46 respectively. The units 62, 64 associated with members 56 and 40 are each in the form of a simple hydraulic ram with a port at each end. The other two units, however (as shown in FIGURE 5 and which illustrates unit 63) each comprise a stepped cylinder having therein a piston 66 slidable in a smaller portion 67 of the cylinder, a piston rod 68 secured to the piston and projecting from the ends of the cylinder and an annular free piston 69 slidable in a larger part 70 of the cylinder and on the piston rod 68. Each cylinder has a port at each end and a central port adjacent the step in the cylinder. The toothed control members 40, 46 are linked to their respective hydraulic cylinder units 64, 65 by a pair of pivoted levers 71, 72 respectively, while forks 73, 74 secured directly to the ends of the piston rods of the other units 62, 63 engage the other two toothed control members 31, 56. The cylinder units are formed in a common cylinder block 75.

Figure 3A:
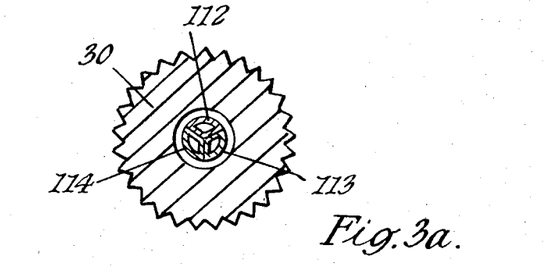
FIGURE 3a is a section on line 3a—3a in FIGURE 3 on an enlarged scale.

The supply of liquid to the cylinder units 62 to 65 controlling the toothed control members is controlled by a selector valve 76 mounted on the cylinder block 75. This selector valve 76 includes a body 77 formed with a shallow cylindrical chamber 77a. Mounted in this chamber is a circular valve plate 78 which is provided around its periphery with a sealing ring 78c engaged with the chamber wall. The valve plate 78 is formed with a central splined hole and is free to slide axially on a splined operating spindle 80 projecting into the chamber through the body wall. The selector valve also includes a circular port plate 81 in which are formed seven ports 81a to 81g. These ports are disposed at different distances from the center of the port plate 81 and are connected respectively to ports of the cylinder units 62, 63 and 64 controlling toothed controlled members 56, 31 and 40 via grooves 75a in the surface of cylinder block 75 on which plate 81 is clamped. The valve plate 78 is also formed with a plurality of bores 78a which are alignable with the ports 81a to 81g. These bores 78a are so arranged that in twelve equiangularly spaced positions of the valve plate 78, twelve different combinations of connections between the ports and the interior of the chambers 77a are achieved.

A supply line 79, to be referred to further hereinafter, opens into the chamber 77a so that when pressurized liquid is present in this line the pressure will be communicated to those ports 81a to 81g which are aligned with bores 78a in the valve plate 78. The side of the valve plate 78 adjacent the port plate 81 is formed with recesses 78b surrounding the various bores. These recesses are interconnected and are connected to the edge of the valve plate 78. The body, moreover, is formed with one or more drain ports 76a which are disposed at the end of the body remote from the chamber 77a. These drain ports 76a enable the liquid in the space between the valve plate 78 and port plate 81 to remain at low pressure and it will be appreciated that any ports 81a to 81g not aligned with bores 78a in the valve plate 78 will open into this space.

Thus, in use, while the mechanism is running a gear change can be preselected by adjusting the selector valve 76 to supply liquid to the cylinder units 62 and 64 and thereby to move the toothed control members to new positions Such movement of the selector valve 76 can only be effected, however when pressure in the supply line 79 is low and insufficient to affect the cylinder units 62 to 64 since when the pressure in the supply line is high, the valve plate 78 will be thrust into engagement with the port plate 81 owing to the difference in pressure between the liquid in the chamber 77a and the liquid in the space between the valve plate 78 and the port plate 81 Thus when it is possible to adjust the selector valve 76 no gear change will take place until there is a rise in pressure in the supply line 79.

Where, as is the case in the example described, the selector valve 76 is disposed in a somewhat inaccessible position, this may be actuated by a remote control device 82 through the intermediary of a connecting rod 83 and bevel gearing 84. Connections 85, 86 between the rod and the control device and between the rod and the bevel gearing are conveniently of the universal kind.

Figure 11:
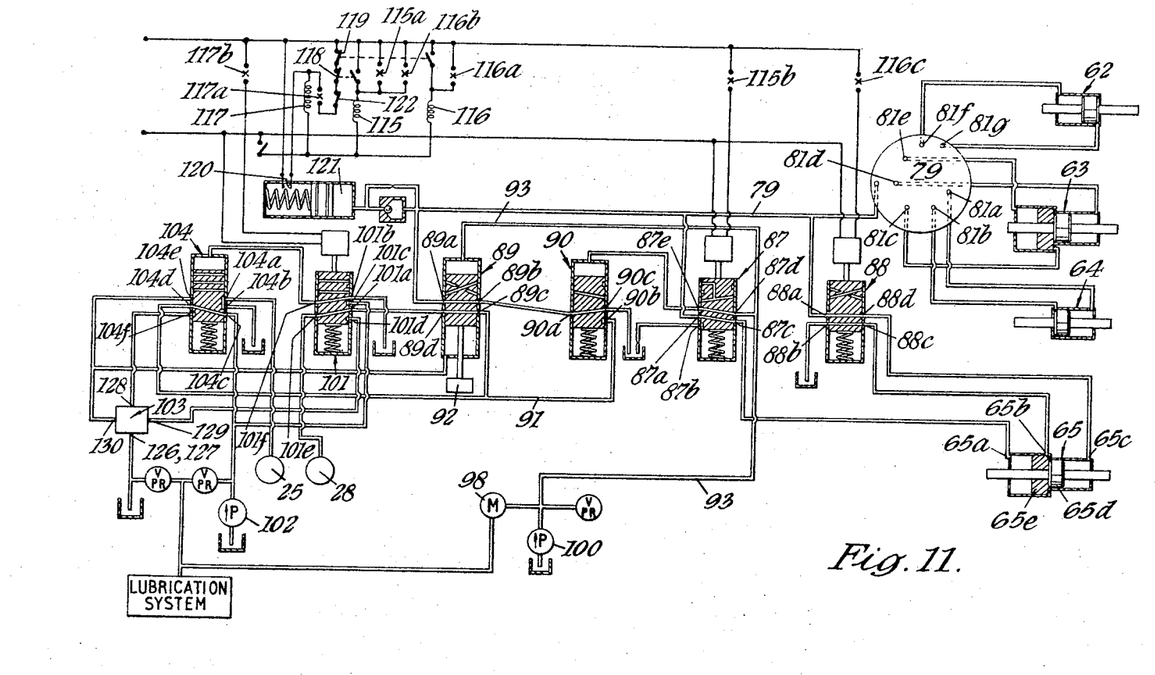
FIGURE 11 is a diagrammatic view showing the electrical and hydraulic circuit arrangements of the transmission described.

The supply of liquid to the cylinder unit 65 of member 46, which determines whether the lathe spindle 20 is rotated forwardly, rearwardly or left free, is controlled by first and second solenoid valves 87, 88. The first of these valves has an inlet port 87a connected to the aforementioned supply line 79 and an outlet port 87b connected to drain as well as a supply port 87c connected to the port 65a at that end of the cylinder unit 65 from which liquid will flow when the member 46 is moved to its first position. This valve is arranged so that the supply port 87c is normally connected to the supply line 79. The second valve 88 is a simple reversing valve with inlet and outlet ports 88a, 88b connected to the supply line 79 and drain respectively and with a pair of supply ports 88c, 88d connected respectively to the step port 65b and the other end port 65c of the cylinder unit 65. This second valve 88 is arranged so that said other end port 65c is normally connected to the supply line 79. Thus when there is pressure in the supply line 79 and neither of the solenoid valves 87, 88 is operated control member 46 will occupy a free spindle position since the same pressure will be applied to the piston 65d in one direction and to the larger free piston 65e in the opposite direction. From this position operation of the first solenoid valve 87 will cause control member 46 to be moved to its first position (to provide forward drive) provided that pressure is present in the supply line 79, and operation of both valves will cause it to be moved to its second position (to provide reverse drive).

The control of the pressure in the supply line 79 is effected by first and second hydraulically operable valves 89, 90. The first of these is a simple reversing valve 89 having four ports one of which (89a) is connected to the supply line 79 and two more of which (89b, 89c) are connected respectively to an input line 91 (to be further described hereinafter) and to supply port 90a of the second hydraulically operable valve 90. The first hydraulically operable valve 89 is provided with a snap action device 92 and its spool is movable in one direction by pressure in a sensing line 93. This spool is movable in the opposite direction by a return device 94 including the above mentioned snap action device 42 which may conveniently include a plunger 95 with a pair of axially spaced grooves into which spring loaded balls 96 are pressed to hold the spool in position when no pressure is applied in either direction. After the return device 92 has been actuated the connections to the valve are such that the supply line 79 is connected to the second hydraulically operable valve 90. The second hydraulically operable valve 90 is spring loaded and has a further pair of ports 90b, 90c connected to the input line and drain respectively. The arrangement of this is such that in the normal position of the valve, the input line 91 is stopped and the supply port 90a is connected to drain and in the other position the drain port 90c is stopped while the supply port 90a is connected to the input line 91. The second hydraulically operable valve is sensitive to the pressure in the sensing line 93 to which it is connected through an additional pair of ports 87d, 87e of the first solenoid valve. These additional ports are arranged so that when the solenoid is de-energized the second hydraulically operable valve 90 is connected to the sensing line 93 whereas on energization this connection is stopped and the valve 90 is connected to drain.

Figure 10:
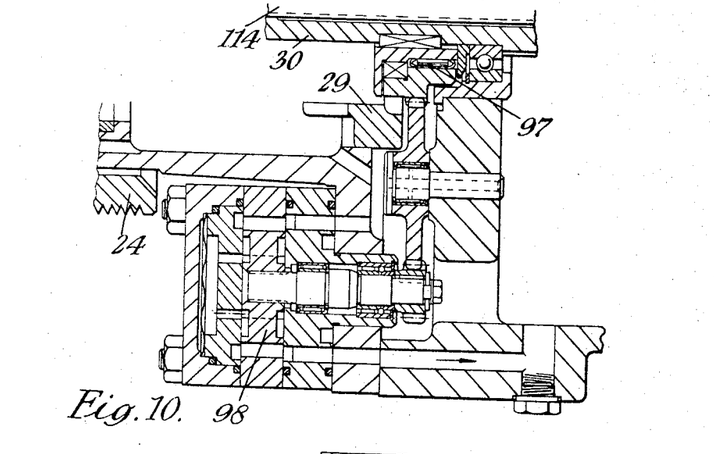
FIGURE 10 is a fragmentary sectional view on line 10—10 in FIGURE 2.

The pressure in the sensing line 93 is determined by the speed of the input shaft 30 of the gear box, since this is connected, through a reduction gear train and a uni-directional clutch 97 to a vane-type fixed displacement hydraulic motor 98 (see FIGURE 10). The uni-directional clutch 97 is arranged so that the input shaft 30 cannot drive the motor 98 and the latter is supplied with liquid, in use, at an insufficient rate for the motor 98 to drive the input shaft. A separate pump 100 is provided for this purpose and may, if desired, also be employed to supply oil to the lubricating system of the lathe. To the conduit supplying oil to the motor 98 the aforesaid sensing line is connected.

Thus, it will be realized that, when the clutch 25 is disengaged and the brake 28 engaged, to start a gear change after the next speed has been selected, the input shaft 30 will be slowed down until the hydraulic motor 98 starts to drive the input shaft. The pressure in the sensing line 93 will then start to rise until it is sufficient to operate the first hydraulically operable valve 89. The second hydraulically operable valve 90 will also be operated provided that the first solenoid valve 87 has not been energized. It will be noted that operation of the first hydraulically operable valve 89 causes the input line 91 to be connected to the supply line 79 so that a preselected gear change will commence. It will also be noted that, if both the clutch 25 and the brake 28 are disengaged as the toothed control members are moved into engagement with the various co-acting parts, the hydraulic motor 98 will drive the gears slowly so that tooth to tooth engagement, obviously highly undesirable, is prevented.

The remaining port 89d of the four-ported first hydraulically operable valve (of which only three ports have so far been mentioned) is connected in the part of the hydraulic circuit for operating the brake 28. This port 89d is connected to an inlet port 101a of a six-ported two position third solenoid valve 101 of which another port 101b is connected to drain, another 101c to main pump 102 and another 101d to a manual control valve 103 (to be described hereinafter). The two outlet ports 101e and 101f of this third hydraulically operable valve 101 are connected respectively to the brake cylinder 28 and to the actuator of a third hydraulically operable valve 104. Thus, during a gear change so long as this third solenoid valve 101 is not energized the condition of the brake 25 will be determined by the first hydraulically operable valve 89 and this will connect it to drain or the input line 91 depending on the pressure in the sensing line 93. Operation of the third solenoid valve 101 stops the first mentioned port 101d and that connected to drain and connects the other two inlet ports 101b, 101d to the two outlet ports 101f and 101e.

The third hydraulically operable valve 104 controls the supply of liquid to the clutch 25 and to the input line 91. The valve has six ports, one, 104a, to the clutch cylinder 25, a second 104b, to drain, a third, 104c, to the main pump 102, a fourth, 104d, to the supply line 91 and fifth and sixth 104e, 104f to different parts of the manual control valve 103. The fifth port 104e is also connected to the return device 94 of the first hydraulically operable valve 89. The valve 104 is spring loaded to a normal position in which the first and second ports 104a, 104b are interconnected, the third and fourth ports 104c, 104d are interconnected and the other two ports 104e, 104f are stopped. On actuation, the valve 104 changes over to a condition in which the first and fifth ports 104a, 104e are interconnected, the second and fourth ports 104b, 104d are interconnected and the third and sixth ports 104c, 104f are interconnected.

The valves 87, 89, 90, 101 and 104 are all mounted in a common block 105 mounted on a part 106 of the headstock casing. Connections between the valves are made by grooves in both faces of a plate 107. The connection to clutch 25, brake 26 and motor 98 are made by bores 108, 109 and 110 in a part 111 of the casing, which bores communicate with tubes 112, 113 and 114 extending through the hollow input shaft 30.

The three solenoid valves 87, 88 and 101 are operable respectively by contacts 115b, 116c, 117b of first, second and third relays 115, 116, 117. These relays are in turn controlled respectively by a first switch 118, a second switch 119 and a pressure switch 120 in an accumulator 121 subjected to supply line pressure. Each of the relays 115, 116, 117 has latching contacts 115a, 116a, 117a and the second relay also has an additional set of contacts 116b for operating the first relay 115. A third switch 122 is also provided for selecting a free-spindle condition.

Figure 4:
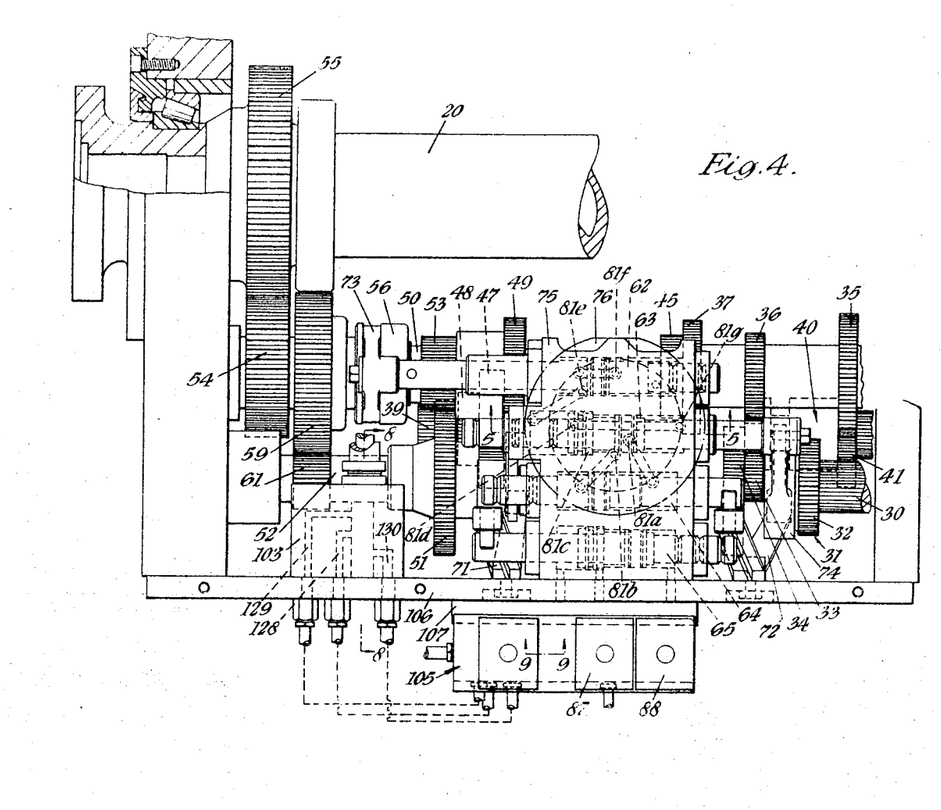
FIGURE 4 is a plan view of the components shown in FIGURES 2 and 3 with parts of the headstock casing removed and/or sectioned to expose the interior thereof.

The aforementioned manual control valve 103 is brought into the circuit only at the completion of a gear change, i.e. when the third hydraulic valve 104 and the third solenoid valve 101 are both operated and the supply line 79 is exhausted through the first and second hydraulic valves 89, 90. This valve 103 (see FIGURE 8) includes a body 123 in which a longitudinal bore is formed. Mounted within this bore are four orifice plates 124 each of which is in the form of a thick disc formed with a central cylindrical recess. The base of the recess in each orifice plate is formed with orifice 124a itself. Each plate also has an external groove housing a sealing ring 125. Moreover the ends of the bore in the body are closed off so that the four orifices divide the body into five chambers. Formed in the body and orifice plates are five ports which communicate with the chambers respectively. The two outermost ports 126, 127 are drain ports and these are connected to drain. The central port 128 (see FIGURE 4) is the inlet port and receives high pressure liquid whenever the third hydraulically operable valve 104 is operated. The remaining two ports 129, 130 are connected respectively to the third solenoid valve 101 and the third hydraulically operable valve 104 and supply liquid to the brake 28 and the clutch 25 respectively when these valves are operated.

Figure 8:
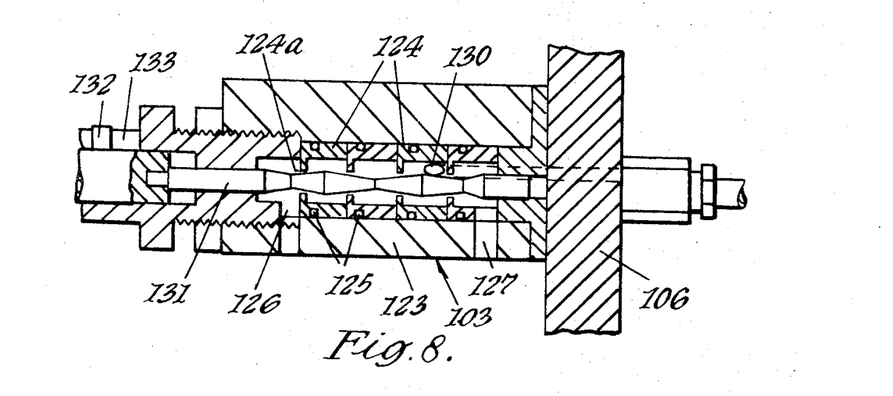
FIGURE 8 is a fragmentary sectional view on line 8—8 in FIGURE 4 the view being on an enlarged scale.
Figure 9:
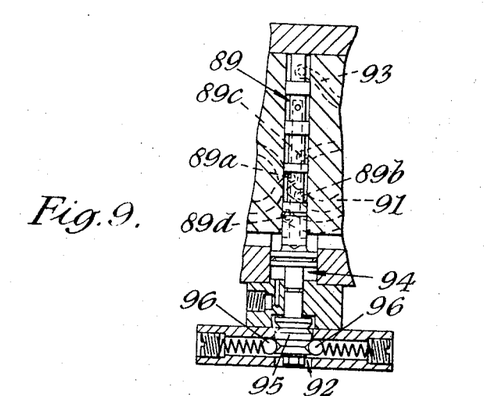
FIGURE 9 is a fragmentary sectional view on line 9—9 in FIGURE 4 the view being on an enlarged scale.

The manual control valve has an operating member in the form of a shaped needle 131 which extends through the four orifices 124. This needle has three waisted portions from each of which it expands frusto-conically in each axial direction. The needle 131 is so shaped that in one extreme position it will completely close the first and third orifices and in the other extreme position it completely closes the second and fourth orifices. Moreover, when the needle 131 is mid-way between its extreme positions all four orifices will be open to the same extent. Thus, slight axial movement of the needle out of the mid-position will cause a change in flow through the valve. The needle 131 is axially movable by a lateral projection 132 or an operating piece secured to one of its ends, with the projection extending into a helical slot 133 in the body and being connected to an operating handle 134 (FIGURE 1). Alternatively axial movement may be achieved by a push-rod or otherwise.

The mechanism is so arranged that when the needle 131 of the manual control valve 103 is in its mid-position neither the clutch 25 nor the brake 28 is fully engaged and the operator, by careful manipulation of the control can run the spindle 20 at a very low speed so that he can inspect work in the lathe or for other purposes.

When the lathe is first started up the three relays 115, 116, 117 are initially all de-energized. The two pumps 101, 102 and the drive 23 to the input pulley 25 are all started. The brake 28 is applied by liquid supplied from the main pump 102 through the third hydraulic valve 104, the input line 91, the first hydraulic valve 89 and the third solenoid valve 101 in series. Thus, the hydraulic motor 98 cannot be driven and pressure in the sensing line 93 rises until the first and second hydraulic valves 89, 90 are operated. Liquid is then supplied to the brake 28 through the third hydraulic valve 104, the input line 91, the second hydraulic valve 90, the first hydraulic valve 89 and the third solenoid valve 101 in series. At the same time liquid from the input line 91 passes through the first hydraulic valve 89 to the supply line 79 and thence through the first solenoid valve 87 and the second solenoid valve 88 to both end ports 65a, 65c of the cylinder unit 65 of toothed control member 46. The supply line 79 also carries liquid to the pre-set selector valve 76 and any necessary gear shifts are effected.

When the gear change is completed the pressure in the supply line 79 rises since flow has ceased. The pressure switch 120 is thus actuated and the third relay 117 energizes the third solenoid valve 101. Liquid passes through the valve 101 and operates the third hydraulic valve 104. The course of events following this action depends upon the state of the manual control valve 103. If this has been set to close its first and third orifices, then lay shafts 38, 39 will be driven at the pre-selected speed. If the other two orifices are closed, then the shafts 38, 39 will remain stationary. In the latter case, the hydraulic motor 98 will remain stationary and the pressure in the sensing line 93 will remain high so that no further changes occur. If the valve 103 is set to operate the clutch 25, however, or when such a setting is selected, the input shaft 30 will rotate, allowing the pressure in the sensing line 93 to drop. The first and second hydraulic valves 89, 90 are then returned to their initial positions.

If the first switch 118 is now operated to select forward running and a new spindle speed has been selected on the selector valve 76, the third relay 117 is deenergized and the first relay 115 is energized. Thus the third solenoid valve 101 returns to its original position cutting off the supply to the actuator of the third hydraulic valve 104 which also returns to its initial condition. The clutch 25 is thereby disengaged and the brake 28 engaged so that the machine slows down. The pressure in the sensing line 76 rises as soon as the hydraulic motor 98 is forced to take over driving, but since the first solenoid valve 87 has been operated by the first relay 115, only the first hydraulic valve 89 is changed over, the second hydraulic valve 90 remaining in its initial position. Liquid then flows to said other end port 65c of the cylinder unit 65 of toothed control member 46 and this is moved to its first position. Meanwhile flow through the selector valve 76 causes the other toother control members to be moved as required. During the actual gear change the brake 28 is released as its cylinder is connected to drain through the third solenoid valve 101, the first hydraulic valve 89 and the second hydraulic valve 90 in series and the hydraulic motor 98 therefore turns the shafts at a low speed to prevent tooth to tooth engagement. The completion of the change is again signalled by a rise in pressure in the supply line 79 so that the pressure switch 120 is operated and the third relay 117 operates the third solenoid valve 101 as before.

Similar sequences of events occur when the second and third switches are actuated with the respective results of reverse running and free spindle.

The invention is not to be confined to any strict conformity to the showings in the drawings but changes or modifications may be made therein so long as such changes or modifications mark no material departure from the spirit and scope of the appended claims.

Having thus described our invention what we claim as new and desire to secure by Letters Patent is:

1. A control valve for use in a power transmission mechanism incorporating a clutch and a brake, including a valve body and an operating member therefor movable from a first position in which the clutch is engaged and the brake disengaged to a second position in which the clutch is disengaged and the brake engaged, with said operating member being positionable in an intermediate position in which neither clutch nor brake is fully engaged and in which slight movement of the operating member in opposite directions increases the engagement of the clutch or brake, said valve body having a longitudinal bore therein, a pair of ports communicating with the bore and adapted for connection to the clutch and brake respectively, further ports communicating with the bore adapted for connection to a pressure fluid supply and drain respectively, first, second, third and fourth orifice defining means located within and extending axially of said bore providing chambers for separating a drain port from the clutch port, the clutch port from the supply port, the supply port from the brake port and the brake port from a drain port respectively, said operating member being defined by a needle body extending longitudinally of said bore through all of said orifices, said needle body being provided with a plurality of frusto-conical portions with the smaller ends of adjacent portions being joined to provide grooves between the joined larger ends of adjacent portions whereby in one extreme position of said needle said first and third orifices are closed and in the opposite extreme position said second and fourth orifices are closed while in a mid-position all of said orifices are open.

2. The control valve as claimed in claim 1 in which each of said orifice defining means comprises a disc of substantial thickness having a central cylindrical aperture therein at one end thereof with the discs being arranged in end to end relationship in said bore.

3. The control valve as claimed in claim 2 including a sealing means between the outer periphery of each disc and the inner periphery of the bore.

References Cited

UNITED STATES PATENTS

| | | | |
|---|---|---|---|
| 207,646 | 9/1878 | Duchamp | 251—215 |
| 2,409,506 | 10/1946 | McFarland | 192—12.1 X |
| 2,465,942 | 3/1949 | Sundt | 192—12.1 X |
| 2,675,024 | 4/1954 | Clark | 137—625.69 X |
| 2,969,045 | 1/1961 | Clar | 137—625.69 X |
| 3,139,908 | 7/1964 | Strader | 137—625.69 X |
| 3,253,613 | 5/1966 | Richott | 137—625.69 X |

BENJAMIN W. WYCHE, III, *Primary Examiner.*